United States Patent [19]

Takamatsu et al.

[11] Patent Number: 5,618,629
[45] Date of Patent: Apr. 8, 1997

[54] FLEXIBLE PARTITION MEMBER FOR HYDRAULIC ACCUMULATOR, INCLUDING ETHYLENE-VINYL ALCOHOL COPOLYMER GAS-BARRIER LAYER AND POLYAMIDE RESIN ELASTIC LAYER

[75] Inventors: Shigeaki Takamatsu, Hekinan; Koyo Murakami, Nagoya, both of Japan

[73] Assignee: Tokai Rubber Industries, Inc., Japan

[21] Appl. No.: 270,796

[22] Filed: Jul. 5, 1994

Related U.S. Application Data

[63] Continuation of Ser. No. 993,028, Dec. 18, 1992, abandoned.

[30] Foreign Application Priority Data

| Dec. 27, 1991 | [JP] | Japan | 3-360712 |
| Mar. 14, 1992 | [JP] | Japan | 4-089819 |
| Mar. 31, 1992 | [JP] | Japan | 4-108684 |
| Mar. 31, 1992 | [JP] | Japan | 4-108687 |

[51] Int. Cl.⁶ .................................................. B32B 27/08
[52] U.S. Cl. ...................... 428/475.5; 138/26; 138/30; 138/141; 138/DIG. 7; 428/475.8; 428/476.1; 428/476.9
[58] Field of Search .................. 138/26, 30, 141, 138/DIG. 7; 428/474.4, 475.5, 475.8, 476.1, 476.9; 525/64, 66

[56] References Cited

U.S. PATENT DOCUMENTS

| 4,698,279 | 10/1987 | Sumiya et al. | 428/411.1 |
| 4,880,213 | 11/1989 | Shinbori et al. | 267/64.27 |
| 4,890,822 | 1/1990 | Ezure et al. | 267/64.24 |
| 5,036,110 | 7/1991 | Moureaux | 521/137 |
| 5,336,538 | 8/1994 | Kitamura | 428/35.2 |
| 5,403,887 | 4/1995 | Kihira et al. | 525/64 |

FOREIGN PATENT DOCUMENTS

| 0132565 | 2/1985 | European Pat. Off. | B32B 27/08 |
| 0482916 | 4/1992 | European Pat. Off. | F15B 1/047 |
| 2667118 | 3/1992 | France | F15B 1/047 |
| 3339836 | 6/1984 | Germany | B32B 2/34 |
| 8507638 | 8/1986 | Germany | F16J 3/02 |
| 4117411 | 12/1991 | Germany | F16J 3/02 |
| 2-165948 | 6/1990 | Japan . | |

OTHER PUBLICATIONS

"Polymermodifizierte Polyamide", Kunstoff–plastics, Heft 1, 1985, s. 20–22.

Primary Examiner—Hoa T. Le
Attorney, Agent, or Firm—Parkhurst, Wendel & Burr, L.L.P.

[57] ABSTRACT

A flexible partition member for a hydraulic accumulator, which divides an interior of a shell of the accumulator into two sections that provide a gas chamber and a liquid chamber, respectively. The flexible partition member includes an integrally layered composite portion which includes at least one gas-barrier layer and at least one elastic layer, each gas-barrier layer containing a copolymer of ethylene and vinyl alcohol, and each elastic layer containing as a major component thereof a polyamide resin selected from the group consisting of nylon 6, nylon 66, nylon 6-10 and nylon 6-12. The integrally layered composite portion includes two adjacent layers which include a gas-barrier layer and an elastic layer.

22 Claims, 7 Drawing Sheets

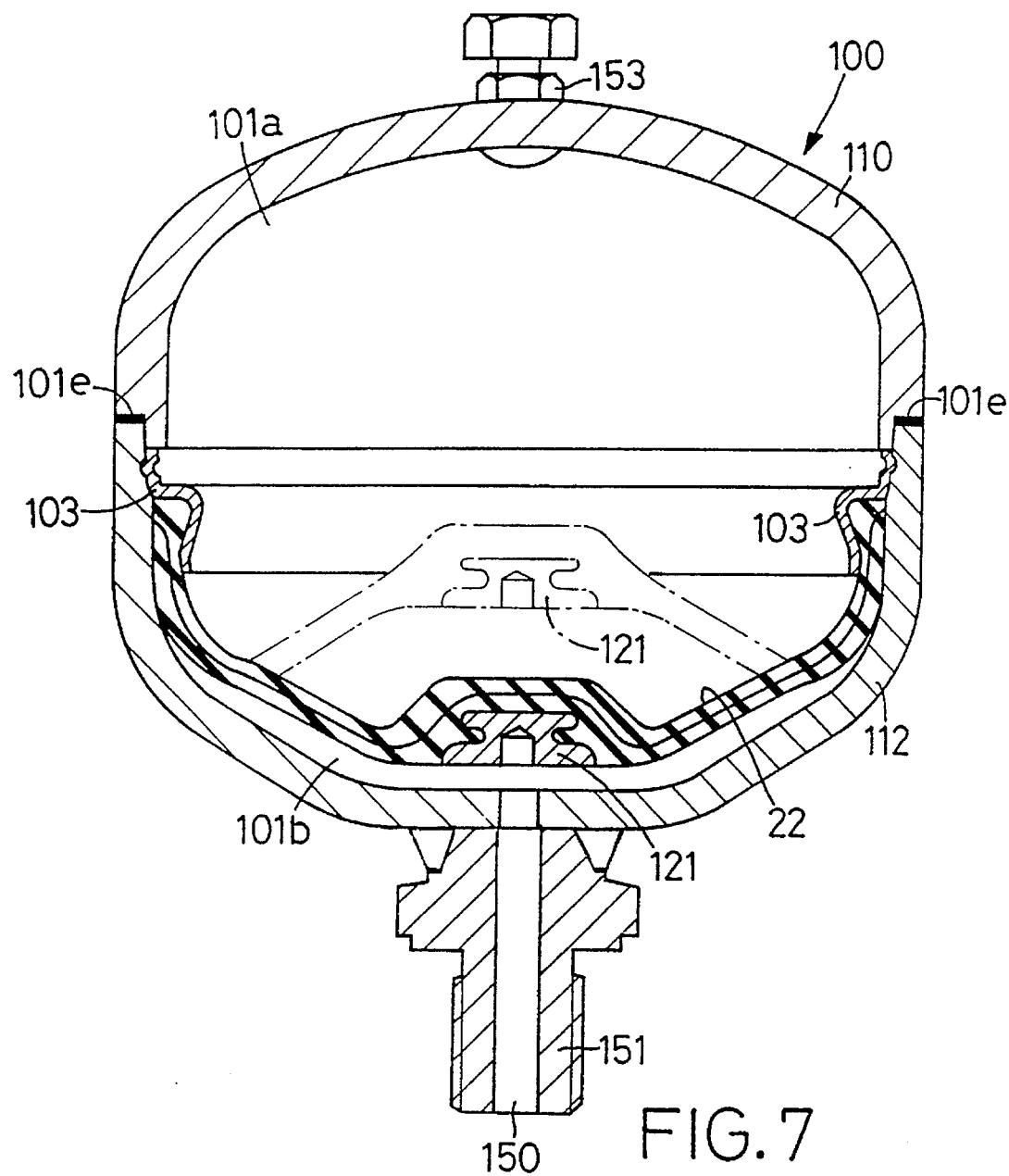

FLEXIBLE PARTITION MEMBER FOR HYDRAULIC ACCUMULATOR, INCLUDING ETHYLENE-VINYL ALCOHOL COPOLYMER GAS-BARRIER LAYER AND POLYAMIDE RESIN ELASTIC LAYER

This is a continuation of application Ser. No. 07/993,028 filed Dec. 18, 1992, now abandoned.

BACKGROUND OF THE INVENTION

1. Field of the Invention

The present invention relates to a hydraulic accumulator used in hydraulic systems for automobiles and other industrial vehicles and equipment, and a flexible partition member in the form of a diaphragm or a bag or bladder used in such a hydraulic accumulator.

2. Discussion of the Prior Art

A hydraulic accumulator has a function of storing a hydraulic fluid under pressure, and generally includes a metallic shell, and a flexible partition member such as a rubber diaphragm or a rubber bag or bladder, which divides the interior of the shell into a gas chamber and a liquid chamber. The diaphragm or bladder (hereinafter generically referred to as "flexible partition member") is formed of a suitable rubber material into a desired shape having a relatively small thickness. The flexible partition member is fixed within the shell, and cooperates with the wall of the shell to define the gas and liquid chambers. The gas chamber is charged with a suitable gas such as $N_2$ gas, while a pressurized oil or liquid is stored in the liquid chamber. The oil is fed into the liquid chamber from a hydraulic pressure source, and the compressed gas acts as a cushion or a spring. During use of the accumulator, the gas trapped in the gas chamber may gradually permeate through the thin flexible partition member, and become incapable of performing its function, due to lowering of the gas pressure which results from the permeation of the gas through the partition member.

One solution to the above drawback is to add a suitable additive or additives to the rubber composition of the flexible partition member, in an attempt to improve the resistance of the partition member to the gas permeation. Although the additives may improve the gas permeation resistance (gas imperviousness or impermeability) of the partition member, the flexibility of the partition member tends to be lowered, and the partition member is likely to crack after a relatively long period of use within the accumulator shell. This is also a problem.

To solve the above problem, it is proposed to interpose an ethylene-vinyl alcohol copolymer resin layer between adjacent thin rubber layers of a flexible partition member, such that the resin layer is bonded to the rubber layers by adhesive layers. An example of a multiple-layered rubber-resin structure is disclosed in JP-A-2-165948. Where this rubber-resin structure is used for a flexible diaphragm or bladder for a hydraulic accumulator, the ethylene-vinyl alcohol resin layer or layers which have a high degree of gas impermeability enable the gas charge in the accumulator shell to maintain its pressure above the lower limit, for a prolonged period of use of the accumulator. However, the ethylene-vinyl alcohol copolymer resin layers suffer from cracking and separation from the rubber layers, after a long use during which the diaphragm or bladder experiences bending deformation or displacement a large number of times. Accordingly, the life expectancy of the accumulator using such diaphragm or bladder is shortened.

An impervious resilient membrane is disclosed in U.S. Pat. No. 5,036,110. This membrane includes two first layers each consisting of a first material, and a second layer interposed between the first layers and consisting of a second material. The first material is selected from the group consisting of thermoplastic polyurethanes, block amide polyethers, flexible polyesters and mixture thereof, while the second material is selected from the group consisting of copolymers of ethylene and vinyl alcohol, polyamides, polyvinylidene chloride and mixture thereof.

Although the second layer is impervious to a gas, some of the first materials indicated above have an insufficient heat resistance and tend to be deteriorated during use of an accumulator in which the temperature of a stored pressurized fluid is relatively high. Further, the other first materials may be softened due to exposure to a hydraulic fluid such as a brake fluid, and tend to have a relatively short service life.

SUMMARY OF THE INVENTION

It is therefore at first object of the present invention to provide a flexible partition member for a hydraulic accumulator, which member is highly durable to assure a long service life of the accumulator.

A second object of the invention is to provide a hydraulic accumulator which has a long service life.

The first object may be achieved according to one aspect of this invention, which provides a flexible partition member for a hydraulic accumulator, which divides an interior of a shell of the accumulator into two sections that provide a gas chamber and a liquid chamber, respectively, the flexible partition member including an integrally layered composite portion which comprises at least one gas-barrier layer and at least one elastic layer. The integrally layered composite portion comprises two adjacent layers which consist of one of the at least one gas-barrier layer and one of the at least one elastic layer. Each of the at least one gas-barrier layer consists of a copolymer of ethylene and vinyl alcohol, and each of the at least one elastic layer contains as a major component thereof a polyamide resin selected from a group consisting of nylon 6, nylon 66, nylon 6-10 and nylon 6-12.

Usually, two rubber layers are bonded by a bonding agent to opposite surfaces of the integrally layered composite portion of the flexible partition member.

In one form of the flexible partition member, the integrally composite portion comprises a center gas-barrier layer, and two elastic layers which are formed on respective opposite surfaces of the center gas-barrier layer. In an alternative form of the flexible partition member, the integrally layered composite portion comprises a center elastic layer, and two gas-barrier layers which are formed on respective opposite surfaces of the center elastic layer.

The present flexible partition member was developed as a result of extensive research and study of the inventors, who paid attention to an excellent property of a copolymer of ethylene and vinyl alcohol (EVOH copolymer) as a gas barrier, namely, a high degree of gas impermeability (resistance to gas permeation) of the EVOH copolymer. Described more particularly, the center gas-barrier layer interposed between the adjacent elastic layers, or the EVOH copolymer gas-barrier layers formed on the opposite surfaces of the center elastic layer effectively function to prevent a gas in the gas chamber of the accumulator from permeating through the integrally layered portion of the flexible partition member, while at the same time the center elastic layer or the elastic layers on the opposite surfaces of the center gas-barrier layer function as a buffer layer or layers for protecting the EVOH copolymer gas-barrier layer or layers against cracking or separation from the adjacent layers. The function of the elastic layer or layers seems to be derived from an elasticity or flexibility value thereof which is intermediate between that of the EVOH copolymer gas-barrier layer or layers and that of the rubber layers which are usually formed on the opposite surfaces of the integrally layered composite portion. Accordingly, the durability of the flexible partition member is considerably increased, even under an operating condition of the accumulator in which the partition member is subjected to repeated bending deformation. Consequently, the life expectancy of the accumulator is accordingly improved.

Further, since the polyamide resin used as a major component of the elastic layer or layers has a melting point near that of the EVOH copolymer, the two materials for the elastic and gas-barrier layers can be co-extruded to simultaneously form the adjacently or alternately formed elastic and gas-barrier layers. At this time, the two materials chemically react with each other, whereby the elastic and gas-barrier layers are bonded together at their interfaces, without any bonding agent or adhesive, which would lower the elasticity of the flexible partition member.

The ethylene-vinyl alcohol copolymer (EVOH copolymber) may preferably consist of 20–65% by weight of ethylene, and the balance being vinyl alcohol. In particular, the EVOH copolymer whose ethylene content (by weight) is 32% is desirable. Where the ethylene content is less than 20% by weight (and the vinyl alcohol content is more than 80%), the gas-barrier property of the gas-barrier layer or layers is considerably increased, but the flexibility is excessively lowered, whereby the gas-barrier layer or layers is/are incapable of undergoing smooth bending deformation or displacement. Where the ethylene content exceeds 65%, the gas-barrier layer or layers cannot demonstrate a sufficiently high degree of gas-barrier property.

The polyamide resin for the elastic layer or layers may be preferably selected from the group consisting of nylon 6, nylon 66, nylon 6-10 and nylon 6-12, which may be used alone or in combination. The polyamide resin including nylon 6 or nylon 66 has a melting point near that of a copolymer of EVOH. In this respect, the polyamide resin may be a mixture of nylon 6 and other nylon materials. Further, the elastic layer may contain not more than 50%, preferably, about 30–40%, by weight of a polyolefine material such as EPM and EPDM. In this case, the polyolefine material functions to prevent the EVOH copolymer of the gas-barrier layer from absorbing an aqueous component. If the EVOH copolymer absorbs an aqueous component, the gas-barrier property of the gas-barrier layer is deteriorated.

The bending modulus of elasticity of the elastic layer which contains not less than 50% by weight of a polyamide resin is intermediate between those of the rubber layers and the EVOH copolymer gas-barrier layers. Where the two elastic layers are formed on the opposite surfaces of a center gas-barrier layer, it is desirable that the bending strength Mv of the EVOH copolymer gas-barrier layer, and the bending strength M of the elastic layers be determined so as to satisfy the following formulas:

$$Mv/M \leq 3$$

$$Mv = 16 E v L v^3$$

$$M = 16 E L^3$$

where,

Ev: Bending modulus of elasticity of the center gas-barrier layer

Lv: Thickness of the center gas-barrier layer

E: Bending modulus of elasticity of the elastic layers

L: Thickness of the elastic layers

The rubber layers which are usually formed on the opposite surfaces of the integrally composite portion of the flexible partition member may be formed of any rubber material conventionally used for a flexible diaphragm, bag or bladder for a hydraulic accumulator. For instance, the rubber layers may consist of acrylonitrile butadiene rubber (NBR).

The second object indicated above may be achieved according to another aspect of this invention, which provides a hydraulic accumulator having a shell, and a flexible partition member which is disposed in the shell and which divides an interior of the shell into two sections that provide a gas chamber and a liquid chamber, respectively, wherein the flexible partition member includes an integrally layered composite portion which comprises at least one gas-barrier layer and at least one elastic layer, each of the at least one gas-barrier layer consisting of a copolymer of ethylene and vinyl alcohol, and each of the at least one elastic layer containing as a major component thereof a polyamide resin. The integrally layered composite portion comprises two adjacent layers which consist of one of the at least one gas-barrier layer and one of the at least one elastic layer.

The present hydraulic accumulator has a prolonged service life, due to the improved durability of the flexible partition member as described above.

The shell of the accumulator is usually formed of a suitable metallic material, such as iron, steel, and metal allows like an aluminum alloy. The shell may take any desired shape, such as a generally spherical shape, a cylindrical shape or a rectangular box-like shape.

The shell may comprise a generally hemispherical upper member and a generally hemispherical lower member which are butted and welded together at open ends thereof so as to form a generally spherical configuration. This two-piece shell arrangement permits easy assembling of the accumulator, as compared with a conventional one-piece shell. Further, the present arrangement facilitates the attachment or fixing of the flexible partition member to the shell, particularly because the partition member can be fixed to the lower member of the shell before the two members are welded together.

The accumulator may have a retainer ring adapted to fix the peripheral portion of the flexible partition member to a part of the inner circumferential surface of the lower member near the open end. The lower member may have a groove formed in the above-indicated part of the inner surface, while the retainer ring has a portion which is calked or forced against the surface defining the above groove, and a portion which forces the peripheral portion of the partition member against the inner circumferential surface of the lower member of the shell.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 7 is an elevational view in cross section of one embodiment of an accumulator of this invention;

DETAILED DESCRIPTION OF THE PREFERRED EMBODIMENTS

Figure 1:
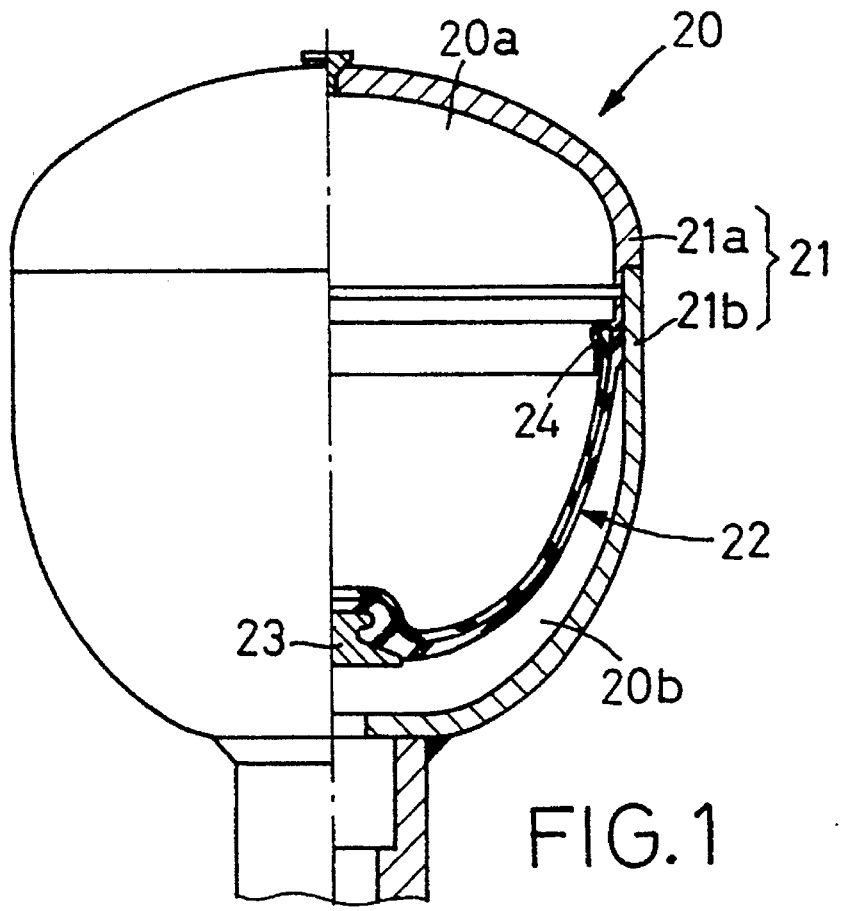
FIG. 1 is an elevational view partly in cross section of a hydraulic accumulator according to one embodiment of the present invention.
Figure 2:
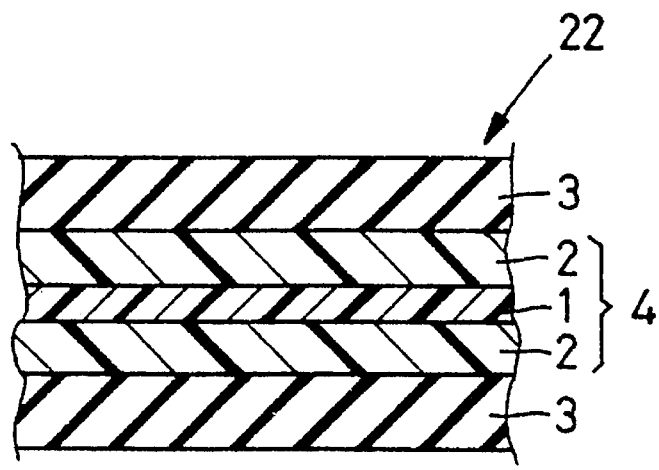
FIG. 2 is a fragmentary cross sectional view of a flexible partition member in the form of a flexible diaphragm fixed in the accumulator of FIG. 1.

Referring first to FIGS. 1 and 2, there will be described a hydraulic accumulator constructed according to one embodiment of this invention.

The hydraulic accumulator, which is indicated generally at 20 in FIG. 1, has a shell 21 made of a metallic material. The shell 21 consists of two generally hemispherical members, that is, an upper hemisphere 21a and a lower hemisphere 21b which are butted and welded together at their open ends, so as to define an enclosure therein. The enclosure is divided by a flexible diaphragm 22, into a gas chamber 20a and an oil or liquid chamber 20b on the upper and lower sides of the diaphragm 22. The lower hemisphere 21b is provided with a poppet valve 23.

Before the two hemispheres 21a and 21b are welded together by electron beam welding, the flexible diaphragm 22 is fixed at its periphery to the open end of the lower hemisphere 21b, such that the peripheral portion of the diaphragm 22 is gripped by and between a retainer ring 24 and an inner circumferential surface of the open end portion of the lower hemisphere 21b. After the flexible diaphragm 22 is attached to the lower hemisphere 21b, the two hemispheres 21a, 21b are electron-beam welded to form the generally spherical accumulator shell 21.

The flexible diaphragm 22 consists of a central gas-barrier layer 1, two elastic layers 2 formed on the opposite surfaces of the gas-barrier layer 1, and two rubber layers 3 formed on the outer surfaces of the respective elastic layers 2. The central gas-barrier layer 1 is formed of a copolymer of ethylene and vinyl alcohol (hereinafter referred to as "EVOH copolymer", where appropriate), while the elastic layers 2 are formed of a polyamide resin. The gas-barrier layer 1 and the two elastic layers 2 cooperate to form an integrally layered composite portion 4. To produce this layered composite portion 4, the selected ethylene-vinyl alcohol copolymer and polyamide resin are co-extruded to simultaneously form the EVOH copolymer central gas-barrier layer 1 and the two polyamide resin elastic layers 2 such that the two elastic layers 2 are bonded to the opposite surfaces of the gas-barrier layer 1, due to a chemical reaction of the EVOH copolymer and polyamide resin at the contacting interfaces. Thus, a bonding agent is not required to form the integrally layered composite portion 4.

Then, a bonding agent known in the art is applied to the opposite surfaces of the layered composite portion 4, and the two rubber layers 3 are formed by pressing of a suitable rubber material. The rubber layers 3 are bonded to the opposite surfaces of the layered composite portion 4 upon subsequent vulcanization of the rubber material. Thus, the flexible diaphragm 22 as shown in FIG. 2 is produced.

To further illustrate the principle of the present invention, some examples of the flexible diaphragm according to the invention will be described, as compared with comparative examples.

EXAMPLE 1

Figures 3, 4:
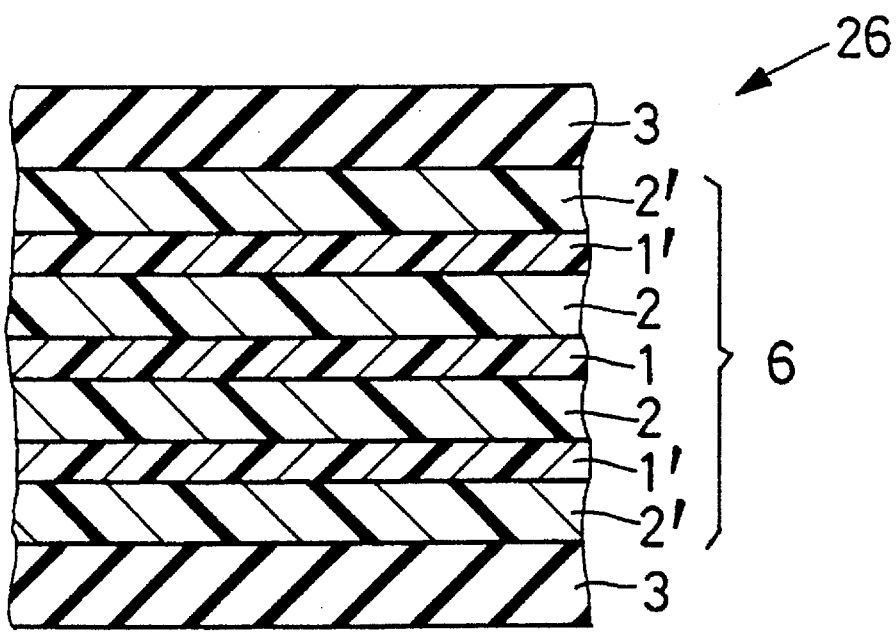
FIG. 3 is a cross sectional view of an integrally layered composite portion of the diaphragm of FIG. 1, which consists of a center gas-barrier layer and two elastic layers.
FIG. 4 is a fragmentary cross sectional view of the flexible partition member according to another embodiment of the invention.

Initially, the layered composite portion 4 was prepared, as shown in FIG. 3. A copolymer of ethylene-vinyl alcohol (EVOH) F-101 available from KURARAY CO. LTD. (Japan), which contains 32% by weight of ethylene, was used for the central gas-barrier layer 1, while a polyamide resin SUPER TOUGH NYLON ST811HS available from Du Pont was used for the elastic layers 2. The EVOH copolymer and polyamide resin were co-extruded to form the three-layered composite portion 4 so that the gas-barrier layer 1 had a thickness of 50 μm, and each of the two elastic layers 2 had a thickness of 80 μm, as indicated in TABLE 1.

Then, the thus prepared three-layered composite portion 4 was coated at its opposite surfaces with a known bonding agent, and the rubber layers 3 were formed of NBR by pressing and vulcanization. Each rubber layer 3 had a thickness of 1790 μm, as also indicated in TABLE 1. In this way, the five-layered flexible diaphragm 22 as shown in FIG. 2 was produced. It is desirable that the thickness $\alpha$ of each elastic layer 2 and the thickness $\beta$ of the central gas-barrier layer 1 be determined so as to satisfy a formula $\alpha/\beta \geq 1$.

EXAMPLE 2

An integrally seven-layered composite portion 6 as shown in FIG. 4 was prepared by co-extrusion, using the same materials as used in EXAMPLE 1. The composite portion 6 consists of the three-layered composite portion 4 of FIG. 3, two outer gas-barrier layers 1' formed on the elastic layers 2 (inner elastic layers), and two outer elastic layers 2' formed on the respective outer gas-barrier layers 1'. As indicated in TABLE 1, all the gas-barrier layers 1, 1' have the same thickness of 50 μm, and the inner elastic layers 2 have the same thickness of 50 μm while the outer elastic layers 2' have the same thickness of 80 μm. It is desirable that the thickness $\alpha$ of each outer elastic layer 2', the thickness $\beta$ of each gas-barrier layer 1, 1' and the thickness $\gamma$ of each inner elastic layer 2 be determined so as to satisfy the formula α/β≧1, and a formula 0.1≦γ/β≦3.5.

EXAMPLE 3

Figure 5:
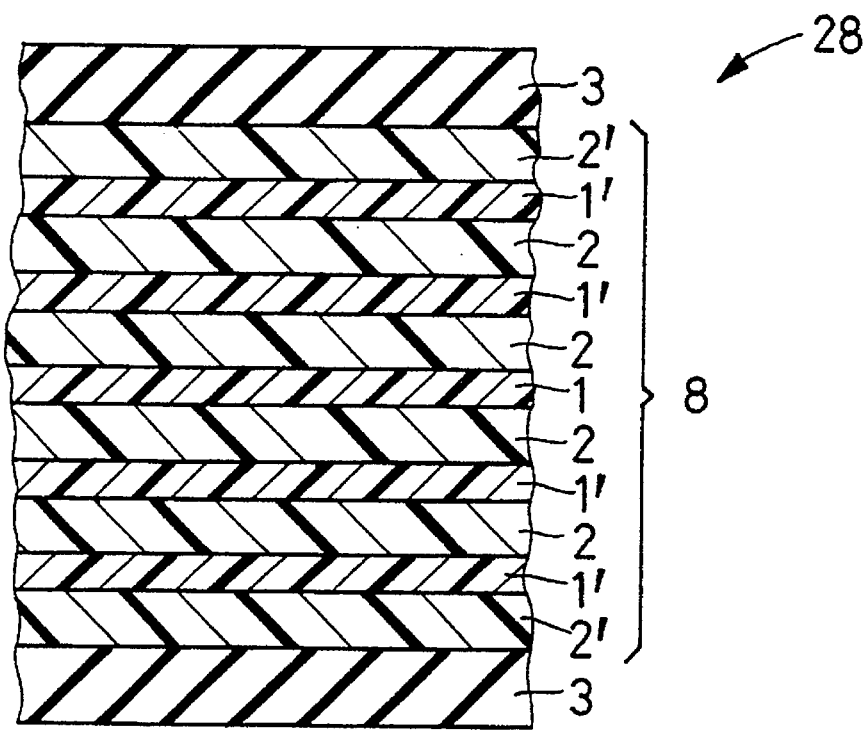
FIG. 5 is a fragmentary cross sectional view of the flexible partition member according to a further embodiment of the invention.

An integrally eleven-layered composite portion 8 as shown in FIG. 5 was prepared by co-extrusion, using the same materials as used in EXAMPLES 1 and 2. The composite portion 9 consists of: the three-layered composite portion 4 of FIG. 3; two intermediate gas-barrier layers 1' on the composite portion 4; two intermediate elastic layers 2 on the intermediate gas-barrier layers 1'; two outer gas-barrier layers 1' on the intermediate elastic layers 2; two outer gas-barrier layers 1' on the intermediate elastic layers 2; and two outer elastic layers 2' on the intermediate outer gas-barrier layers 1'. Then, the NBR rubber layers 3 were formed on the outer elastic layers 2', whereby a thirteen-layered flexible diaphragm 28 as shown in FIG. 5 was produced.

Figure 6A:
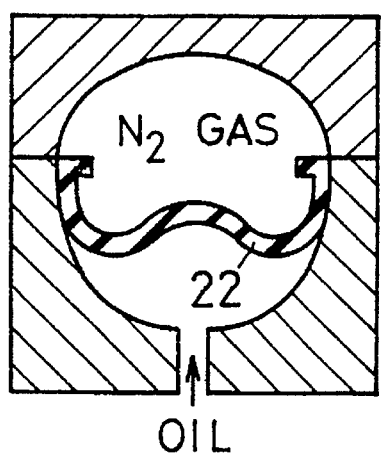
FIG. 6A and 6B are views indicating bending deformation of the diaphragm of FIG. 4 when an oil pressure applied to the diaphragm is changed during a test of the accumulator of FIG. 2.
Figure 6B:
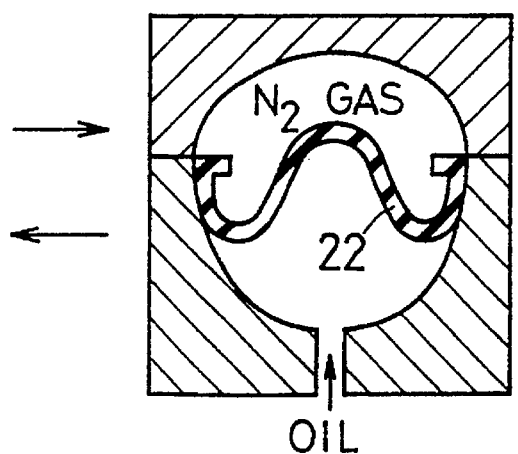

The layers 1, 1', 2 and 2' have the thickness values as indicated in TABLE 1. It is desirable that the thickness α of the outer elastic layers 2', the thickness β of each gas-barrier layer 1, 1' and the thickness γ of each inner or intermediate elastic layer 2 be determined so as to satisfy the inequalities α/β≧1, and 0.1 ≦γ/β≦3.5, as in EXAMPLE 2.

specimens for the cracking resistance of the EVOH copolymer gas-barrier layers, the specimens were set in a device as shown in FIGS. 6A and 6B. During the endurance test, one of the chambers on one side of the specimen diaphragm was charged with $N_2$ gas, while the hydraulic pressure applied to the other chamber was cyclically changed, to cause repeated bending deformation of the diaphragm, as indicated in FIGS. 6A and 6B. The amount of the $N_2$ gas permeation through the specimen diaphragms was measured in an initial period of the endurance test, and after the completion of the test. The results of the flexibility and endurance tests are indicated in TABLE 2.

TABLE 1

|  |  | EXAMPLES | | | Comparative Examples | |
|---|---|---|---|---|---|---|
|  |  | 1 | 2 | 3 | 1 | 2 |
| CENTER GAS-BARRIER LAYER (1) | Thickness β *1 | 50 | 50 | 50 | 100 | 50 |
|  | Bending Strength Mv *2 | 0.04 | 0.04 | 0.04 | 0.32 | 0.04 |
|  | Modulus of Elasticity *3 | 20000 | 20000 | 20000 | 20000 | 20000 |
| OTHER GAS-BARRIER LAYERS (1') | Thickness *1 | — | 50 | 50 | — | — |
|  | Bending Strength Mv *2 | — | 0.04 | 0.04 | — | — |
|  | Modulus of Elasticity *3 | — | 20000 | 20000 | — | — |
| OUTER ELASTIC LAYERS (2') | Thickness α *1 | 80 | 80 | 80 | — | — |
|  | Bending Strength M *2 | 0.03 | 0.03 | 0.03 | — | — |
|  | Modulus of Elasticity *3 | 4000 | 4000 | 4000 | — | — |
| OTHER ELASTIC LAYERS (2) | Thickness γ *1 | — | 50 | 50 | 30 | — | — |
|  | Bending Strength *2 | — | 0.008 | 0.008 | 0.002 | — | — |
|  | Modulus of Elasticity *3 | — | 4000 | 4000 | 4000 | — | — |
| RUBBER LAYERS (3) | Thickness *1 | 1790 | 1590 | 1390 | 1470 | 1900 | 1950 |
|  | Modulus of Elasticity *3 | 100 | 100 | 100 | 100 | 100 | 100 |
| Mv/M |  | 1.33 | 1.33 | 1.33 | 1.33 | — | — |
| α/β |  | 1.6 | 1.6 | 1.6 | 1.6 | — | — |
| γ/β |  | — | 1 | 1 | 0.6 | — | — |

*1: μm
*2: kgf · cm
*3: kgf/cm$^2$

COMPARATIVE EXAMPLES 1 AND 2

Two comparative specimens were prepared. Each specimen consists of a center gas-barrier layer formed by extrusion of the same EVOH copolymer as used in EXAMPLES 1–3, and two NBR rubber layers which were formed by pressing and bonded by a bonding agent to the opposite surfaces of the gas-barrier layer. The thickness of the gas-barrier and rubber layers of the two specimens are indicated in TABLE 1.

The flexible diaphragms 22, 26 and 28 of EXAMPLES 1, 2 and 3, and the specimens of COMPARATIVE EXAMPLES 1 and 2 were evaluated in terms of the flexibility, and resistance to cracking and gas permeation. The flexibility was examined by bending by hands the specimens of the invention and the comparative specimens. To test the

TABLE 2

|  | EXAMPLES | | | Comparative Examples | |
|---|---|---|---|---|---|
|  | 1 | 2 | 3 | 1 | 2 |
| Flexibility | Good | Good | Good | Good | Good |
| Number of Cracks of Gas-Barrier Layers | None | None | None | 4 | 5 |
| $N_2$ Gas Permeation |  |  |  |  |  |
| Initial period | None | None | None | None | None |
| After endurance test | None | None | None | Yes | Yes |

In the endurance test using the device shown in FIGS. 6A and 6B, the hydraulic pressure applied to each specimen diaphragm was alternately changed between the level 2.5 times that of the $N_2$ gas and the level 3 times that of the $N_2$ gas, to cause bending deformation or displacement of the specimens. This pressure changing cycle was repeated one million times at a frequency of 0.3 Hz, at 80° C.

It will be understood from TABLE 2 that the flexible diaphragms 22, 26 and 28 according to the present invention demonstrated considerably better results than the comparative examples.

Figure 8:
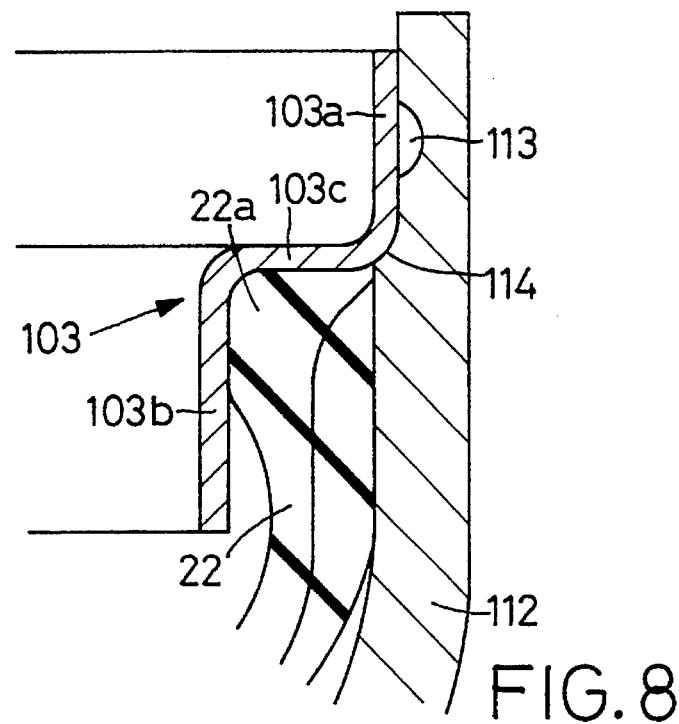
FIG. 8 is a fragmentary enlarged view in cross section of the accumulator of FIG. 7 before a retainer ring for fixing the diaphragm is calked against a lower hemisphere of the shell of the accumulator.
Figure 9:
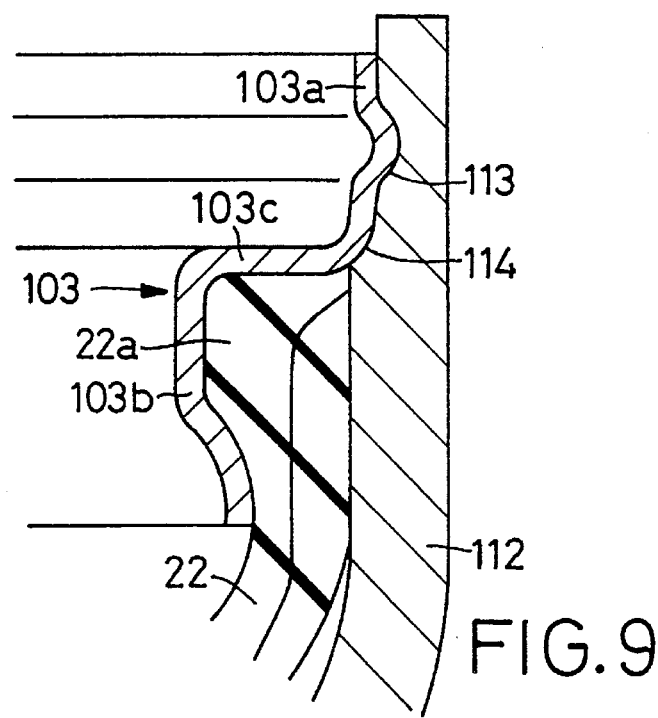
FIG. 9 is a fragmentary enlarged view after the retainer ring of FIG. 8 is calked against the lower hemisphere.

Referring next to FIGS. 7–9, there will be described an accumulator 100 which incorporates the flexible diaphragm of FIG. 2. The accumulator 100, which is similar in construction to the accumulator 20 of FIG. 1, has a substantially spherical metal shell which consists of an upper and a lower hemisphere 110, 112, as shown in FIG. 7. The accumulator 100 was assembled in the following manner.

Initially, the flexible diaphragm 22 whose peripheral portion 22a is relatively thickened as shown in FIG. 8 was positioned within the lower hemisphere 112 such that the peripheral portion 22a was fixed by a retainer ring 103 to the inner circumferential surface of the hemisphere 112, near the open end at which the hemisphere 112 was subsequently welded to the upper hemisphere 110. To this end, the lower hemisphere 112 was provided with a circumferential groove 113 formed in the inner surface adjacent to the open end face, and a circumferential fillet 114 formed below the circumferential groove 113, as shown in FIG. 8. The retainer ring 103 has a stepped structure having a large-diameter portion 103a, a small-diameter portion 103b, and a shoulder portion 103c. For fixing the diaphragm 22, the diaphragm 22 and the retainer ring 103 were first positioned such that the peripheral portion 22a of the diaphragm 22 was in contact with a part of the inner circumferential surface of the lower hemisphere 112 which is spaced some distance from the circumferential groove 113, and such that the large-diameter portion 103a of the ring 103 was in contact with a part of the inner surface in which the groove 113 is formed, while the small-diameter and shoulder portions 103b and 103c were in contact with the thick-walled peripheral portion 22a of the diaphragm 22. In this condition, the retainer ring 103 was calked at a portion thereof facing the groove 113, so that this portion was pressed against the surface of the groove 113, as shown in FIG. 9. Thus, the peripheral portion 22a of the diaphragm 22 was gripped by and between the outer surface of the small-diameter and shoulder portions 103b, 103c of the ring 103 and the inner surface of the lower hemisphere 112. The provision of the circumferential groove 113 and the calking of the ring 103 assure firm fastening of the diaphragm 22 and improve the fluid tightness between the diaphragm 22 and the lower hemisphere 112, preventing passage and leakage of the gas and the hydraulic fluid through the interface between the diaphragm 22 and the lower hemisphere 112. The fillet 114 formed below the groove 113 assures precise positioning of the retainer ring 103 and the diaphragm 22 relative to the lower hemisphere 112.

After the flexible diaphragm 22 was attached to the lower hemisphere 112, the upper and lower hemispheres 110 and 112 were butted together at the open end faces, as indicated in FIG. 7, so as to define a generally spherical shell of the accumulator 100. At this time, the attachment of the diaphragm 22 to the lower hemisphere 112 can be checked for adequacy, before the lower hemisphere 112 is closed by the upper hemisphere 110. The two hemispheres 110, 112 were welded together at their end faces by an electron beam welding technique, as indicated at 101e in FIG. 7. Since the welding point 101e is spaced a considerable distance from the peripheral portion 22a of the diaphragm 22, the peripheral portion 22a is protected against an adverse influence by the heat produced in the welding process. Thus, there was produced the accumulator 100 which has a gas chamber 101a defined by the diaphragm 22 and the upper hemisphere 110, and a liquid chamber in the form of an oil chamber 101b defined by the diaphragm 22 and the lower hemisphere 112. The accumulator 100 has a poppet valve 121 associated with the lower side of the diaphragm 22, an oil port plug 151 having an oil passage 150 communicating with the oil chamber 101b, and a gas port plug 153 associated with the gas chamber 101a. One-dot chain lines in FIG. 7 indicate the position of the diaphragm 22 when it is elastically displaced.

Figure 10:
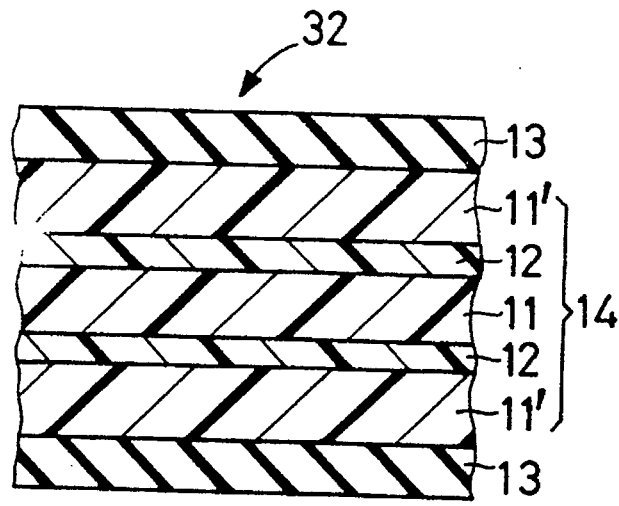
FIG. 10 is a fragmentary cross sectional view of the flexible partition member according to a yet further embodiment of the present invention.
Figure 11:
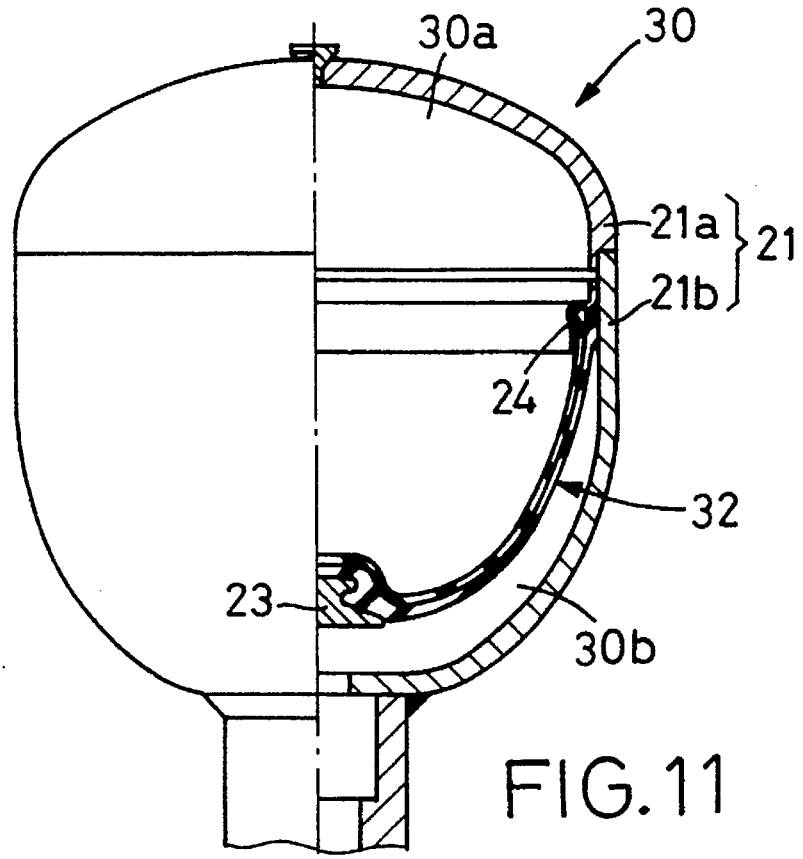
FIG. 11 is an elevational view partly in cross section of an accumulator which incorporates the partition member of FIG. 10.

Referring to FIGS. 10 and 11, there will be described a modified embodiment of this invention, in which an accumulator 30 uses a flexible diaphragm 32 whose integrally layered composite portion 14 is different from the integrally layered composite portions 4, 6, 8 used in the preceding embodiments. The diaphragm 32 cooperates with the shell 21 to define a gas chamber 30a and a liquid or oil chamber 30b.

More specifically described by reference to FIG. 11, the integrally layered composite portion 14 consists of five layers, namely, a center elastic layer 11 whose major component is a polyamide resin, two gas-barrier layers 12 of a EVOH copolymer formed on the opposite surfaces of the center elastic layer 11, and two outer elastic layers 11' formed on the respective gas-barrier layers 12. The integrally five-layered composite portion 14 is formed by co-extrusion using the selected polyamide resin and EVOH copolymer, to simultaneously form the center elastic layer 11, and the gas-barrier layer 12 and outer elastic layers 11' on each side of the center elastic layer 11. No bonding agents are used to form the integrally five-layered composite portion 14 of the diaphragm 32. Two rubber layers 13 are bonded to the outer surfaces of the outer elastic layers 11'. Thus, the prepared diaphragm 32 is fixed in the shell 21 of the accumulator 30, as shown in FIG. 11.

EXAMPLES 4 AND 5

Initially, the five-layered composite portion 14 was prepared by co-extrusion of the same materials for the gas-barrier layers 12 and the elastic layers 11, 11', as used in EXAMPLES 1–3, such that the EVOH copolymer gas-barrier layers 12 were formed on the opposite surfaces of the polyamide resin center elastic layer 11, and the outer polyamide resin outer elastic layers 11' were formed on the respective gas-barrier layers 12. The layers 11, 11' and 12 of EXAMPLES 4 and 5 have the thickness values as indicated in TABLE 3.

Then, the thus prepared five-layered composite portion 14 was coated at its opposite surfaces with a known bonding agent, and the NBR rubber layers 13 were formed by pressing and vulcanization. The rubber layers 13 have the thickness values indicated in TABLE 3. In this way, the seven-layered flexible diaphragm 32 as shown in FIG. 10 was produced.

COMPARATIVE EXAMPLES 3–7

Five comparative specimens were prepared. Each specimen of COMPARATIVE EXAMPLES 3–5 consists of five layers, that is, an EVOH copolymer center gas-barrier layer formed by extrusion, two polyamide resin elastic layers formed also by extrusion on the center gas barrier layer, and two NBR rubber layers which were formed by pressing and bonded by a bonding agent to the opposite surfaces of the EVOH copolymer center gas-barrier layer. The specimens of EXAMPLES 6 and 7 consist of three layers, that is an EVOH copolymer center gas-barrier layer and two NBR rubber layers. The EVOH copolymer, polyamide resin and NBR used are the same as used in EXAMPLES 4 and 5. The thickness values of the constituent layers of the comparative specimens are indicated in TABLE 3.

The flexible diaphragms 32 of EXAMPLES 4 and 5, and the specimens of COMPARATIVE EXAMPLES 3–7 were evaluated in terms of the flexibility, and resistance to cracking and gas permeation, in the same fashion as described above with respect to EXAMPLES 1–3 and COMPARATIVE EXAMPLES 1 and 2. The results of the flexibility and endurance tests are indicated also in TABLE 3.

It will be understood from TABLE 3 that the diaphragms 32 according to EXAMPLES 4 and 5 did not suffer from cracking of the gas-barrier layers 12.

Figure 12:
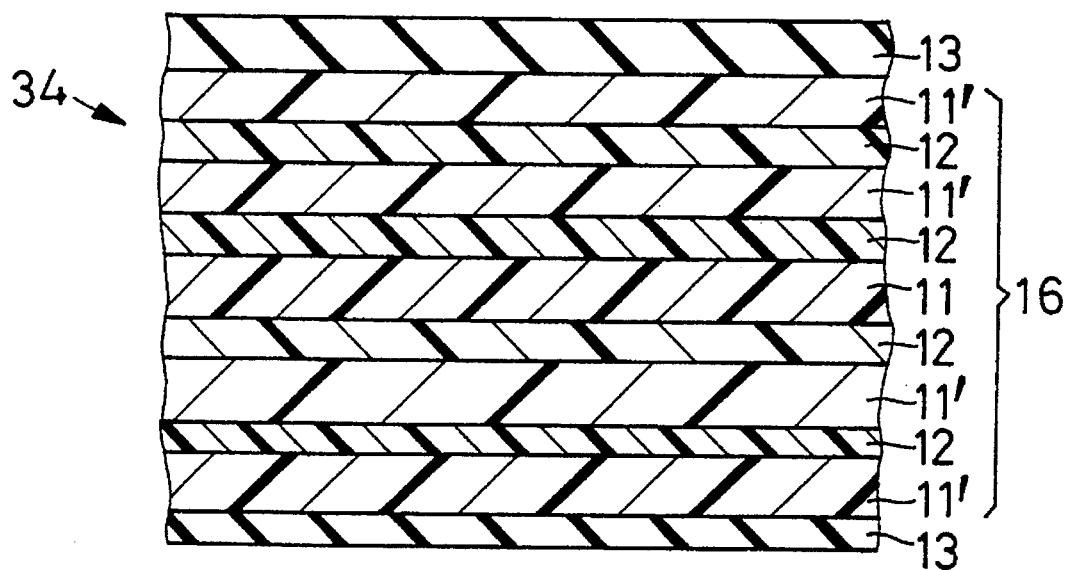
FIG. 12 is a fragmentary cross sectional view of the partition member according to a still further embodiment of the invention.

Referring to FIG. 12, there is shown a flexible diaphragm 34, which is a modification of the diaphragm 32 of FIG. 10. The diaphragm 34 has an integrally nine-layered composite portion 16, which consists of: the five-layered composite portion 14 of the diaphragm 32 of FIG. 10; two outer EVOH copolymer gas-barrier layers 12 formed on the intermediate polyamide resin elastic layers 11' of the five-layered composite portion 14; and two outer polyamide resin elastic layers 11' on the respective two outer EVOH copolymer gas-barrier layers 12. The two NBR rubber layers 13 are formed on the outer elastic layers 11'. Thus, the diaphragm 34 include two inner gas-barrier layers 12, two outer gas-barrier layers 12, one center elastic layer 11, two intermediate elastic layers 11' and two outer elastic layers 11'.

consists of two pieces in the form of the upper and lower hemispheres 21a, 21b, 110, 112, the shell may be a one-piece structure which has an opening through which the diaphragm or bladder is installed within the shell.

The invention may be embodied with various other changes, modifications and improvements, which may occur to those skilled in the art, without departing from the spirit and scope of the invention defined in the following claims.

What is claimed is:

1. A partition member for a hydraulic accumulator that divides an interior of a shell of the accumulator into two sections that provide a gas chamber and a liquid chamber, respectively, said partition member comprising:

an integrally laminated composite portion comprising two adjacent layers that consist of (i) a gas-barrier layer consisting of a copolymer of ethylene and vinyl alcohol, and (ii) an elastic layer consisting essentially of a polyamide resin and a polyolefin material, said polyamide resin being present in an amount of at least 50% by weight of said elastic layer and being selected from the group consisting of nylon 6, nylon 66, nylon 6-10 and nylon 6-12, and said polyolefin material being present to prevent the copolymer of ethylene and vinyl alcohol in said gas-barrier layer from absorbing an aqueous hydraulic fluid component as opposed to an elastic layer without said polyolefin material; and a rubber layer bonded to each of opposite outer surfaces of said integrally laminated composite portion.

2. A partition member according to claim 1, wherein said gas-barrier layer comprises a center gas-barrier layer, and said elastic layer comprises two outer elastic layers, said

TABLE 3

|  |  | EXAMPLE | | Comparative Examples | | | | |
|---|---|---|---|---|---|---|---|---|
|  |  | 4 | 5 | 3 | 4 | 5 | 6 | 7 |
| CENTER LAYER | Thickness of Elastic Layer *1 | 100 | 150 | — | — | — | — | — |
|  | Thickness of EVOH Layer *1 | — | — | 200 | 100 | 100 | 100 | 70 |
|  | Bending Strength *2 | 0.064 | 0.216 | 2.56 | 0.32 | 0.32 | 0.32 | 0.11 |
| EVOH GAS-BARRIER LAYERS | Thickness *1 | 100 | 100 | — | — | — | — | — |
|  | Bending Strength *2 | 0.32 | 0.32 | — | — | — | — | — |
| ELASTIC LAYER (NON-CENTER LAYER) | Thickness *1 | 150 | 150 | 300 | 120 | 240 | — | — |
|  | Bending Strength *2 | 0.216 | 0.216 | 1.728 | 0.11 | 0.88 | — | — |
| RUBBER LAYER | Thickness *1 | 1900 | 1850 | 1700 | 2160 | 1920 | 400 | 2400 |
| FLEXIBILITY |  | Good | Good | Poor | Good | Good | Good | Good |
| $N_2$ GAS PERMEATION | Initial Period | None | None | None |  | Slightly Detected |  |  |
|  | After Test | None | None | None | None | None | Yes | Yes |
| NUMBER OF CRACKS OF GAS-BARRIER LAYERS |  | None | None | None | None | None | 4 | 5 |

*1: μm
*2: kgf · cm

While the present invention has been described in detail in its presently preferred embodiments and forms, for illustrative purpose only, it is to be understood that the invention is not limited to the details of the illustrated embodiments, but may be otherwise embodied.

In the illustrated examples, each of the diaphragms 22, 26, 28, 32 and 34 in the illustrated examples has two rubber layers 3, 13 on the opposite sides of the integrally layered composite portion 4, 6, 8, 14, 16. However, the rubber layers may be eliminated.

Although the shell of the illustrated accumulators 20, 30, 100 of FIGS. 1, 7 and 11 is generally spherical, the shell may take any other configuration such as a cylinder or a rectangular box. Further, the shell of the illustrated accumulator center gas-barrier layer being interposed between and in contact with said two outer elastic layers.

3. A partition member according to claim 2, wherein each of said two outer elastic layers and said center gas-barrier layer have thickness values α and β, respectively, which satisfy $\alpha/\beta \leq 1$.

4. A partition member according to claim 1, wherein said gas-barrier layer comprises a center gas-barrier layer and two outer gas-barrier layers, and said elastic layer comprises two inner elastic layers and two outer elastic layers, said center gas-barrier layer being interposed between and in contact with said two inner elastic layers, and said two outer gas-barrier layers being formed on and in direct contact with said two inner elastic layers, respectively, while said two outer elastic layers being formed on said two outer gas-barrier layers, respectively.

5. A partition member according to claim 4, wherein each of said outer elastic layers and said center gas-barrier layer have thickness values $\alpha$ and $\beta$, respectively, which satisfy $\alpha/\beta \leq 1$.

6. A partition member according to claim 5, wherein each of said two inner elastic layers has a thickness value $\gamma$ which satisfies $0.1 \leq \gamma/\beta \leq 3.5$.

7. A partition member according to claim 1, wherein said gas-barrier layer comprises a center gas-barrier layer, two intermediate gas-barrier layers and two outer gas-barrier layers, and said elastic layer comprises two inner elastic layers, two intermediate elastic layers and two outer elastic layers, said center gas-barrier layer being interposed between and in contact with said two inner elastic layers, said two intermediate gas-barrier layers being formed on and in direct contact with said two inner elastic layers, respectively, said two intermediate elastic layers being formed on and in direct contact with said two intermediate gas-barrier layers, respectively, said two outer gas-barrier layers being formed on and in direct contact with said two intermediate elastic layers, respectively, and said two outer elastic layers being formed on said two outer gas-barrier layers, respectively.

8. A partition member according to claim 7, wherein each of said outer elastic layers and said center gas-barrier layer have thickness values of $\alpha$ and $\beta$, respectively, which satisfy $\alpha/\beta \geq 1$, and wherein each of said two inner elastic layers and said two intermediate elastic layers has a thickness value $\gamma$ which satisfies $0.1 \leq \gamma/\beta \leq 3.5$.

9. A partition member according to claim 1, wherein said elastic layer comprises a center elastic layer and two outer elastic layers, and said gas-barrier layer comprises two intermediate gas barrier layers, said center elastic layer being interposed between and in contact with said two intermediate gas-barrier layers, respectively, and said two outer elastic layers being formed on said two intermediate gas-barrier layers, respectively.

10. A partition member according to claim 1, wherein said elastic layer comprises a center elastic layer, two intermediate elastic layers and two outer elastic layers, and said gas-barrier layer comprises two inner gas-barrier layers and two outer gas-barrier layers, said center elastic layer being interposed between and in contact with said two inner gas-barrier layers, said two intermediate elastic layers being formed on and in direct contact with said two inner gas-barrier layers, respectively, said two outer gas-barrier layers being formed on and in direct contact with said two intermediate elastic layers, and said outer elastic layers being formed on said two outer gas-barrier layers.

11. A partition member according to claim 1, wherein said copolymer of ethylene and vinyl alcohol consists of 20–65% by weight of ethylene and the balance being vinyl alcohol.

12. A partition member according to claim 1, wherein said elastic layer has a bending modulus of elasticity which is intermediate between that of said gas-barrier layer and that of said rubber layer.

13. A partition member according to claim 12, wherein said elastic layer has a bending strength M and said gas-barrier layer has a bending strength Mv, which satisfy the following formulas:

$$Mv/M \leq 3$$

$$Mv = 16 E v L v^3$$

$$M = 16 E L^3$$

where

Ev is the bending modulus of elasticity of said gas-barrier layer,

E is the bending modulus of elasticity of said elastic layer,

Lv is the thickness of said gas-barrier layer, and

L is the thickness of said elastic layer.

14. A hydraulic accumulator having a shell and a partition member that is disposed in said shell and that divides an interior of said shell into two sections that provide a gas chamber and a liquid chamber, respectively, said partition member comprising:

an integrally laminated composite portion comprising two adjacent layers that consist of (i) a gas-barrier layer consisting of a copolymer of ethylene and vinyl alcohol, and (ii) an elastic layer consisting essentially of a polyamide resin and a polyolefin material, said polyamide resin being present in an amount of at least 50% by weight of said elastic layer and being selected from the group consisting of nylon 6, nylon 66, nylon 6-10 and nylon 6-12, and said polyolefin material being present to prevent the copolymer of ethylene and vinyl alcohol in said gas-barrier layer from absorbing an aqueous hydraulic fluid component as opposed to an elastic layer without said polyolefin material; and a rubber layer bonded to each of opposite outer surfaces of said integrally laminated composite portion.

15. A hydraulic accumulator according to claim 14, wherein said shell comprises a generally hemispherical upper member and a generally hemispherical lower member which are butted and welded together at open ends thereof, said hydraulic accumulator further comprising a retainer ring for fixing a peripheral portion of said partition member to a part of an inner circumferential surface of said lower member near said open end.

16. A hydraulic accumulator according to claim 15, wherein said generally hemispherical lower member has a groove formed in said part of said inner circumferential surface, and said retainer ring has a portion calked against a surface defining said groove, and a portion which forces said peripheral portion of said flexible partition member against said inner circumferential surface of said lower member.

17. A hydraulic accumulator according to claim 14, wherein said partition member consists of a diaphragm which cooperates with said shell to define said gas and liquid chambers on opposite sides of said diaphragm.

18. A hydraulic accumulator according to claim 14, wherein said gas-barrier layer comprises a center gas-barrier layer, and said elastic layer comprises two outer elastic layers, said center gas-barrier layer being interposed between and in contact with said two outer elastic layers.

19. A hydraulic accumulator according to claim 14, wherein said elastic layer comprises a center elastic layer, and said gas-barrier layer comprises two outer gas-barrier layers, said center elastic layer being interposed between and in contact with said two outer gas-barrier layers.

20. A hydraulic accumulator according to claims 14, wherein said copolymer of ethylene and vinyl alcohol consists of 20–65% by weight of ethylene and the balance being vinyl alcohol.

21. A partition member according to claim 14, wherein said elastic layer has a bending modulus of elasticity which is intermediate between that of said gas-barrier layer and that of said rubber layer.

22. A flexible partition member according to claim 21, wherein said elastic layer has a bending strength M and said gas-barrier layer has a bending strength Mv, which satisfy the following formulas:

$$Mv/M \leq 3$$

$$Mv = 16 E v L v^3$$

$$M = 16 E L^3$$

where

Ev is the bending modulus of elasticity of said gas-barrier layer,

E is the bending modulus of elasticity of said elastic layer,

Lv is the thickness of said gas-barrier layer, and

L is the thickness of said elastic layer.

\* \* \* \* \*